Figure 1:
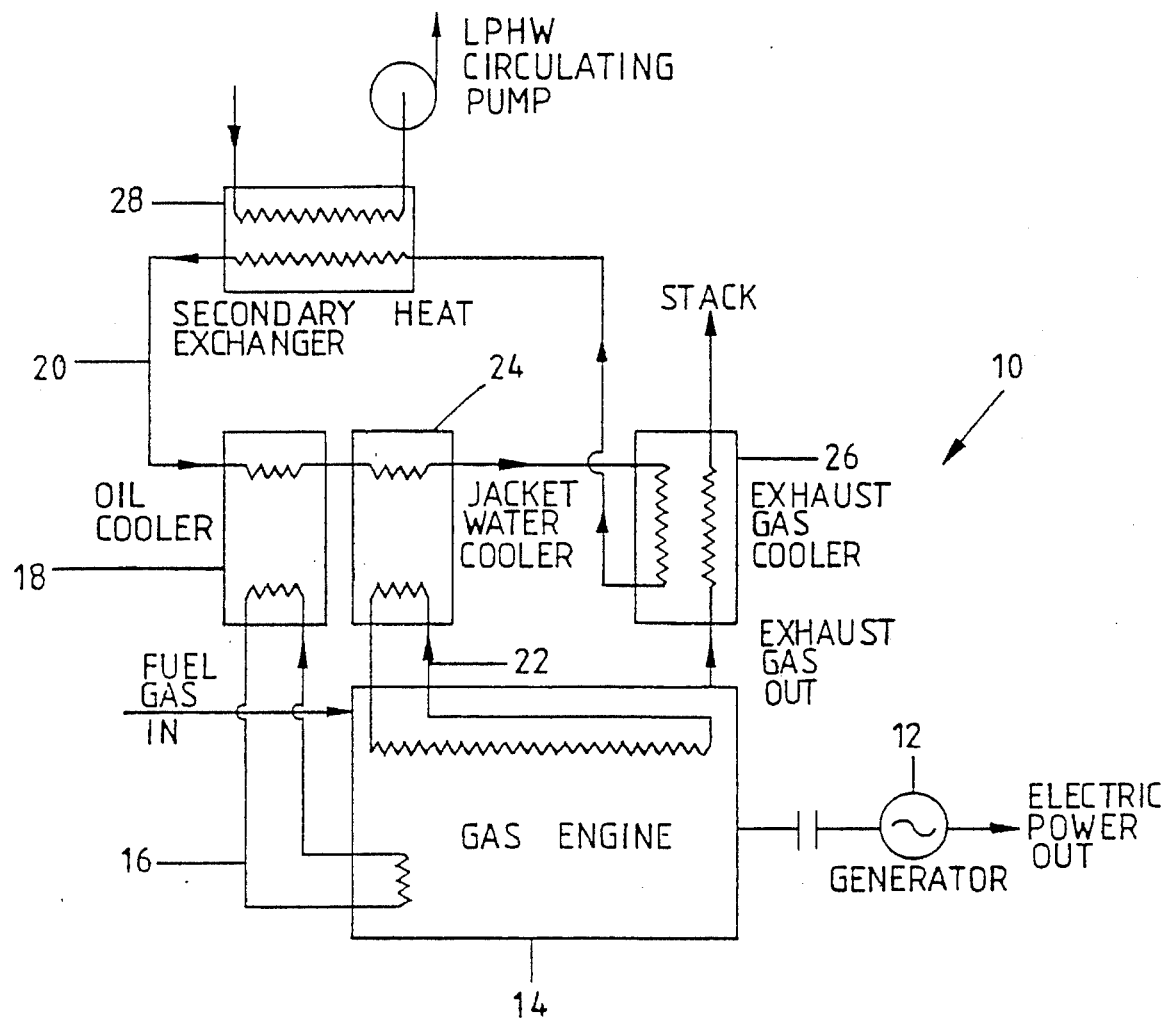

United States Patent [19]
Knowles

[11] Patent Number: 5,535,944
[45] Date of Patent: Jul. 16, 1996

[54] COMBINED HEAT AND POWER SYSTEM

[75] Inventor: Joseph Knowles, Enfield, England

[73] Assignee: Tilehouse Group PLC, Enfield, England

[21] Appl. No.: 170,267
[22] PCT Filed: Jul. 2, 1992
[86] PCT No.: PCT/GB92/01199
   § 371 Date: Dec. 29, 1993
   § 102(e) Date: Dec. 29, 1993
[87] PCT Pub. No.: WO93/01403
   PCT Pub. Date: Jan. 21, 1993

[30]   Foreign Application Priority Data

Jul. 2, 1991 [GB] United Kingdom .................. 9114301

[51] Int. Cl.$^6$ .............. H02K 9/00; F25B 27/00; F24H 3/02
[52] U.S. Cl. .............. 237/13; 237/12.3 A; 34/86
[58] Field of Search .............. 237/12.3 A, 13, 237/12.1, 49; 34/86

[56]   References Cited

U.S. PATENT DOCUMENTS

| | | | |
|---|---|---|---|
| 2,465,184 | 3/1949 | Alderman | 237/49 X |
| 3,231,986 | 2/1966 | Touton | 34/219 |
| 4,240,581 | 12/1980 | Fowler | 34/86 X |

*Primary Examiner*—Henry A. Bennett
*Assistant Examiner*—Steve Gravini
*Attorney, Agent, or Firm*—Ware, Fressola, Van Der Sluys & Adolphson

[57]   ABSTRACT

A combined heat and power (CPH) system for a building has an electrical generator (12) For supply power and a gas engine (14) which drives the generator, contained in a housing (30). Recirculating air is drawn in through an inlet (32), over the electric generator, gas engine and its cooling and exhaust systems (38, 36) where it is heated by waste heat. It is then mixed with controlled amounts of fresh air to regulate the air temperature before being passed into the building air recirculating system. The gas engine can be run at a constant speed which is not dependent on the required temperature of the recirculating air.

12 Claims, 2 Drawing Sheets

COMBINED HEAT AND POWER SYSTEM

The present invention relates to a combined heat and power system for generating electrical power and heat for a building.

A conventional low pressure hot water (LPHW) combined heat and power system comprises a gas engine driving an electric generator which provides a portion of the power required by a building. Waste heat from the combustion process in the engine is collected from the engine cooling system and exhaust system and transferred to a low pressure hot water system by way of separate heat exchangers. The LPHW is pumped around the building to provide hot water for radiators, domestic hot water systems and possibly to air handling unit heating coils. Such a system is used in, for example, leisure centres and swimming baths, hotels, hospitals and sheltered housing.

However, one of the disadvantages of a conventional combined heat and power system is the difficulty of recovery of waste heat from the engine and generator surfaces which prevents the efficiency of the system rising above about 80%.

The present invention seeks to provide an improved system for providing electrical power and heating for a building.

Accordingly, the present invention provides a system for providing electrical power and heating for a building, comprising:

a housing having an air inlet and first outlet for connection to a ventilation air system of the building and wherein the housing contains:

an electrical generator for generating electrical power;
power drive means for driving said generator;

means for drawing recirculating air from said housing first inlet to said housing air outlet past said electrical generator and drive means whereby said air is heated by waste heat from said generator and said drive means;

wherein said housing has a second inlet downstream of said drive means for inlet of external air and said adjusting means comprising means for mixing said recirculating air with said external air to adjust the temperature of recirculating air passed to said first outlet; and wherein said housing has a second outlet downstream of said drive means for exhausting recirculating air to atmosphere, and said mixing means comprises exhaust damper means for controlling the passage of recirculating air through said second outlet.

and adjusting means downstream of said drive means for adjusting the temperature of said air;

and wherein said housing has a second inlet downstream of said drive means for inlet of external air and said adjusting means comprising means for mixing said recirculating air with said external air to adjust the temperature of recirculating air passed to said first outlet.

The phrase "external air" as used herein refers to air which does not form part of the recirculating air.

The term "gas engine" as used herein refers to any suitable type of engine, e.g. internal combustion engine or gas turbine engine.

In a preferred embodiment of the invention the drive means has a cooling system including a heat exchanger for transferring heat from the cooling system to air flowing from the housing inlet to the outlet. The engine is a gas engine and has a further heat exchanger in an exhaust gas system of the engine for transferring heat from exhaust gases of the engine to air passing from said housing inlet to said outlet. It will be appreciated that the heat exchangers may be placed in parallel with reference to the air flow or in series and may be provided with respective air bypass arrangements to allow the flow of air partially or completely to bypass either one or both of the heat exchangers.

To further extract heat from the exhaust gas, the path of the exhaust system may be routed back through the engine/generator housing where additional extended surface heat exchangers may be installed.

Figure 2:
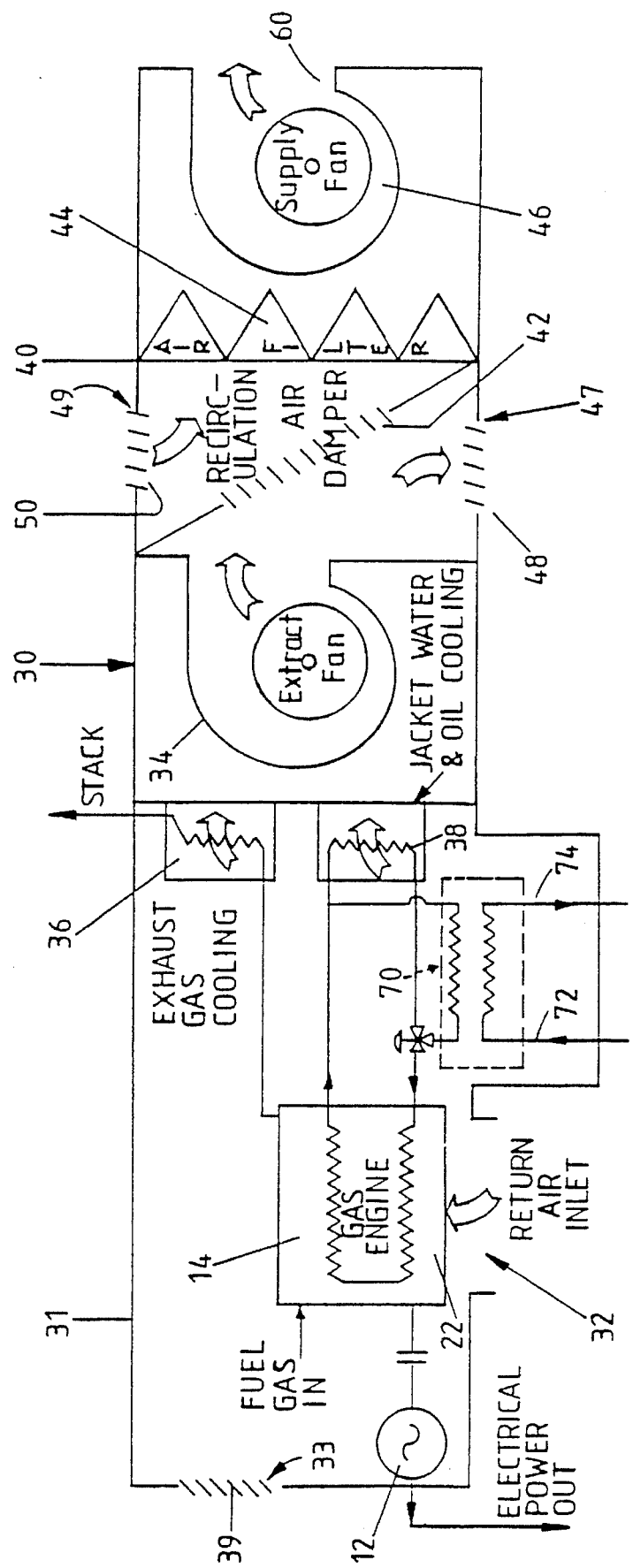

The present invention is further described hereinafter, by way of example, with reference to the accompanying drawings, in which:

FIG. 1 is a schematic diagram of a conventional low pressure hot water combined heat and power system; and FIG. 2 is a schematic diagram of a preferred form of combined heat and power system according to the present invention.

Referring firstly to FIG. 1 a conventional LPHW combined heat and power system 10 has an electric generator 12 which is driven by a gas engine 14 to provide electrical power for a building such as a hospital or leisure centre. The gas engine 14 has an oil lubricating system 16 which includes an oil cooler heat exchanger 18 (sometimes omitted) which transfers heat from the oil to a fluid, normally water, circulating around a closed circuit 20. The gas engine also has a cooling system 22 in which the coolant, normally water, is passed through a heat exchanger 24 to transfer heat to the water circulating in the circuit 20.

Exhaust gas from the gas engine is also passed through a further heat exchanger 26 to transfer heat from the exhaust gas to the circulating water in the circuit 20.

Finally, heat from the circulating water in the circuit 20 is passed to a low pressure hot water system through a further heat exchanger 28. Several variants of this type of system exist, but in each, all of the recovered heat is transferred to water as the transport medium.

The known system of FIG. 1 suffers from several disadvantages. The gas engine output must be varied in order to take account of variations in electricity and hot water requirements and has a thermal efficiency of about 80% with a considerable wastage of hot air.

Referring now to FIG. 2, this shows a preferred form of combined heat and power system for a building according to the present invention. In this system the gas engine 14 and the electrical generator 12 are enclosed in a housing 30 in a compartment 31 at one end thereof. The housing has a recirculating air inlet 32 adjacent the gas engine 14 through which recirculating air from the building ventilation air system is drawn by an extractor fan 34. The fan 34 is mounted in the housing in a position to draw air from the air inlet 32, around the generator 12 and gas engine 14, over a heat exchanger 36 in an exhaust gas line of the gas engine 14 and also over a heat exchanger 38 in the cooling system of the engine in order to transfer waste heat from these to the circulating air. The compartment 31 also has a cooling air inlet 33 with a controlling damper 39 which can be adjusted to allow varying amounts of cool, fresh air (external air) into the compartment 31 to mix with the recirculating air drawn in through the air inlet 32. This provides an efficient way of introducing the statutory requirement of fresh air into the ventilation system during the heating season. It also serves to increase the efficiency of heat recovery from the engine and generator surfaces. The inlet damper 39 also enables the temperature of air drawn by the extractor fan 34 to be varied and allows the cooling effect of the circulating air on the gas engine 14 and the generator 12 to be varied.

The air from the extractor fan 34 is then passed through a mixing box 40 in the housing 30. The mixing box 40 has a recirculation air damper 42 extending across the air flow path to control the amount of air flowing from the extractor fan to an air filter and supply fan downstream of the air damper 42. An exhaust outlet 47 with a controlling air damper 48 is provided in the housing 30 between the extractor fan 34 and the recirculation air damper to control the amount of circulating air which is exhausted to atmosphere whilst a fresh air inlet 49 and controlling damper 50 is provided downstream of the recirculation air damper 42 to control the amount of fresh, external air which is allowed into the housing to mix with warm air from the extractor fan 34. This provides control over the temperature of the circulating air.

The dampers 42, 48 and 50 are controlled by one or more temperature sensors which monitor the temperature of the circulating air in the building.

The air thus passing through the air filter 44 and any other components of an air conditioning system (not shown) which may be present is then passed through an outlet 60 to circulation ducts in the building ventilation air system by a supply fan 46 to provide heating during the cooler part of the year.

The preferred form of the invention uses fewer component parts and provides a more compact installation than the known system and therefore has a lower equipment cost. The potential total thermal efficiency of the system is 95% or higher, and exceeds that of the known LPHW system by 10%–15%. In the system of FIG. 2 the gas engine 14 can be run continuously at its optimum running conditions with any excess heat generated being dumped to atmosphere through the exhaust air damper 48. This avoids the need to vary the operating output of the gas engine as in the known system of FIG. 1.

A further heat exchanger 70 can also be incorporated in the system to provide hot water for a low pressure hot water system for the building. This can be effected by providing a low pressure water inlet 72 and outlet 74 in the housing interconnected by the heat exchanger which is also connected in the cooling system of the engine. This low pressure hot water may be used as domestic hot water or for heat transfer in another air system. Alternatively, the cooling water in the cooling system can be used direct.

What is claimed is:

1. A system for providing electrical power and heating for a building, comprising:
    a housing having a first inlet and an air outlet for connection to a ventilation air system of the building and wherein the housing contains:
    an electrical generator for generating electrical power;
    power drive means for driving said generator;
    means for drawing recirculating air from said first inlet to said air outlet past said electrical generator and drive means whereby the recirculating air is heated by waste heat from said generator and said drive means;
    and adjusting means downstream of said drive means for adjusting the temperature of the recirculating air;
    wherein said housing has a second inlet downstream of said drive means for inlet of external air and said adjusting means comprises mixing means for mixing the recirculating air with the external air to adjust the temperature of the recirculating air passed to said air outlet;
    and wherein said housing has a second outlet downstream of said drive means for exhausting the recirculating air to an external atmosphere, and said mixing means comprises exhaust damper means for controlling the passage of the recirculating air through said second outlet.

2. A system according to claim 1, wherein said mixing means comprises second inlet damper means for controlling the passage of the external air through said second inlet.

3. A system according to claim 2, wherein said second outlet is upstream of said second inlet and said mixing means further comprises a recirculation damper means between said second outlet and said second inlet for controlling the flow of the recirculating air passing said second inlet.

4. A system according to claim 3, wherein said adjusting means further comprises means for monitoring the temperature of the recirculating air external of said housing and controlling said damper means in dependence thereon.

5. A system according to claim 4, wherein said housing has a third inlet for inlet of the external air upstream of said drive means.

6. A system according to claim 5, wherein the system further comprises third inlet damper means for controlling the passage of the external air through said third inlet.

7. A system according to claim 6, wherein said drive means is a gas engine having a cooling system and an exhaust gas system.

8. A system according to claim 7, wherein the system further comprises first heat exchanger means in at least one of said cooling system and said exhaust gas system for transferring heat therefrom to the recirculating air.

9. A system according to claim 8, wherein said housing further comprises:
    a fourth inlet and a third outlet for connection to a low pressure hot water system of the buildings;
    and a second heat exchanger means interconnecting said fourth inlet and said third outlet for transferring waste heat from said drive means to said low pressure hot water system.

10. A system according to claim 9, wherein said second heat exchanger means is connected in said cooling system of said gas engine.

11. A system according to claim 1, wherein said adjusting means further comprises means for monitoring the temperature of the recirculating air external of said housing and controlling said damper means in dependence thereon.

12. A system according to claim 7, wherein the system further comprises third inlet damper means for controlling the passage of the external air through said third inlet.

* * * * *